United States Patent [19]

Sourdille et al.

[11] Patent Number: 5,094,522
[45] Date of Patent: Mar. 10, 1992

[54] METHOD OF AUTOMATIC CONTROL OF MEANS FOR ADJUSTING AN APPARATUS FOR OBSERVING A SUBJECT, MEANS FOR PERFORMING THE METHOD, AND APPARATUS EQUIPPED WITH THESE MEANS

[76] Inventors: Philippe Sourdille, 3 place Anatole France, 44000 Nantes; Jacques Charlier, 8 Allee Vauban, 59650 Villeneuve D'Ascq, both of France

[21] Appl. No.: 534,259

[22] Filed: Jun. 7, 1990

[30] Foreign Application Priority Data

Jun. 9, 1989 [FR] France ............................ 89 07986

[51] Int. Cl.⁵ .......................... A61B 3/14; A61B 3/10
[52] U.S. Cl. ..................................... 351/210; 351/205
[58] Field of Search ............... 351/210, 224, 225, 226, 351/205; 250/221

[56] References Cited

U.S. PATENT DOCUMENTS

| | | | |
|---|---|---|---|
| 4,528,989 | 7/1985 | Weinblatt | 351/210 X |
| 4,613,219 | 9/1986 | Vogel | 351/210 |
| 4,789,235 | 12/1988 | Borah | 351/210 X |
| 4,859,050 | 8/1989 | Borah | 351/210 |

FOREIGN PATENT DOCUMENTS 00232   3/1986   France .
8715953 11/1987  France .

OTHER PUBLICATIONS

*Applied Optics*, Crane et al, vol. 24, No. 4, Feb. 1985, pp. 527–537, "Generation-V-Dual-Purkinje-Image Eyetracker".
Kawai et al article, "Eye Movement Analysis System Using Fundus Images", 1984, Mar.-Apr., pp. 82-90.

*Primary Examiner*—Rodney B. Bovernick
*Attorney, Agent, or Firm*—Kerkam, Stowell, Kondracki & Clarke

[57] ABSTRACT

The invention relates to a method for automatic control of means for adjusting an apparatus for observing a subject in the sight of at least one person. It is characterized in that to command the displacement of the visual field (7) to a zone of the subject that the observer wishes to have appear as a zone of vision, relative to the reference system (R) associated with each optical system (4) at the time of its definition, the principle is altered in a variable manner as a function of the magnitude of the angle measured between the sight direction and the optical axis, which makes it possible to isolate in imaginary fashion, in the field of sight (14), at least one central field (15) having its axis approximately coincident with the optical axis (9) of the optical system (4) in question, in the form of a cone with its apex (S) substantially coincident with the center of the pupil of at least one eye of the observer and having its envelope at least partly contained in the visual field (7) and then to divide the field of sight (14) in imaginary fashion into approximately at least two coaxial volumes (16, 17, 18).

7 Claims, 2 Drawing Sheets

METHOD OF AUTOMATIC CONTROL OF MEANS FOR ADJUSTING AN APPARATUS FOR OBSERVING A SUBJECT, MEANS FOR PERFORMING THE METHOD, AND APPARATUS EQUIPPED WITH THESE MEANS

FIELD OF THE INVENTION

The invention relates to a method for automatic control of means for adjusting an apparatus for observing a subject in the sight of at least one person.

The invention also relates to the means for performing this method, and to apparatus equipped with these means.

BACKGROUND OF THE INVENTION

The term "apparatus for observing a subject" is generally intended to mean an optically aided apparatus for use by a person, such as an operating microscope used in surgery, but is not to be specifically limited to this in the context of the invention.

The term "optical system" is understood more particularly as any optical system enabling a person to visualize a subject of observation, at least indirectly, for instance with increased spatial resolution, in particular by magnification of the image projected on the retina of the eye of this person.

The term "visual field" is understood to be the spatial range observed in which the optical system produces its effect; in the case of a microscope, for example, it is the range observed by the operator and in which the magnification sought is obtained.

More precisely, but not exclusively, the invention relates to a method on the one hand for controlling the displacement of the visual field of the optical system of the apparatus and on the other hand of the adjustment of the focusing of this optical system.

Generally, the visual field of an optical system is defined by a conical surface centered on its optical axis.

The displacement of the visual field relates to the relative displacement between the subject and the optical system along at least one axis substantially perpendicular to the optical axis.

Focusing relates to the adjustment that, by a relative displacement substantially in the direction of observation between the subject and at least one of the elements of the optical system, enables the observer to visualize one of the planes of the visual field, which are generally orthogonal to the optical axis, with a certain definition.

In general, the improvement afforded by these optical systems to one parameter of the range of visual perception is achieved to the detriment of other parameters.

For example, an increase in the optical magnification of the image is accompanied by a shrinkage of the visual field and a lessening of the depth of field.

If the range of visual perception is widened, then the role of oculomotor functions, such as sight orientation and accommodation, is markedly reduced.

Optical apparatus having these particular features, such as microscopes used in surgery, are thus conventionally equipped with various adjusting means, including means for adjusting the position of the visual field, the definition, and the magnification.

It will be appreciated that modifications in adjustment necessitate conscious and voluntary action by the observer.

In the case of a surgical microscope, the decisions of the surgeon must be executed quickly and without error.

Since the person's hands are generally occupied with the manipulation of surgical instruments, he may for example have recourse to some external aid, such as an assistant, but this is expensive, and it involves not only a certain response time but also a relatively major risk of mistakes.

Similarly, to modify the adjustments, the surgeon can use pedal-actuated commands, but this offers limited command possibilities and entails an increased risk of confusion in emergencies.

Vocal command with automatic speech recognition could have been an advantageous solution, except that at the moment it is more oriented to all-or-nothing commands than to continuous commands.

Moreover, in situations of nervous tension, the reliability of vocal recognition is altered because of modifications in the tone of voice or changes in the ambient sound level.

OBJECT AND SUMMARY OF THE INVENTION

The object of the present invention is to use the ocular movements of the observer to automatically assure the various aforementioned adjustments, that is, both the adjustment of the location of the visual field and the adjustment of definition.

The purpose here is not to make some designation and/or selection of functions by sight (as in U.S. Pat. Nos. 4,109,145 and 3,883,234, and European Patent 55338), but to command the modifications of at least one adjustment in a substantially continuous manner, rather than in discrete increments.

Hence the subject of the invention is a method for automatic control of means for adjusting an apparatus for observing a subject in the sight of at least one person, which is characterized in particular in that, in order to command the displacement of the visual field to a zone of the subject that the observer wishes to have appear as a zone of vision, relative to the reference system associated with each optical system at the time of its definition, a principle is variably altered as a function of the magnitude of the angle measured between the sight direction and the optical axis, making it possible to isolate at least one central field in imaginary fashion in the field of sight, this field having its axis approximately coincident with the optical axis of the optical system in question, in the form of a cone with its apex substantially coincident with the center of the pupil of at least one eye of the observer and having its envelope at least partly contained in the visual field, and then to divide the field of sight in imaginary fashion into approximately at least two coaxial volumes, that is, a central volume, in which when the sight direction is detected in it, the function of displacement of the visual field is at least partially inhibited, and a peripheral volume, in which when the sight direction is detected in it, the means for adjusting the position of the visual field with respect to the subject is commanded in such a manner as to locate the observed point in the central volume, and preferably on the optical axis of the optical system in question. The invention also relates to means for performing this method.

The invention will be better understood from the ensuing detailed but non-limiting description, in conjunction with the accompanying drawings.

DESCRIPTION OF THE PREFERRED EMBODIMENT

Figure 1:
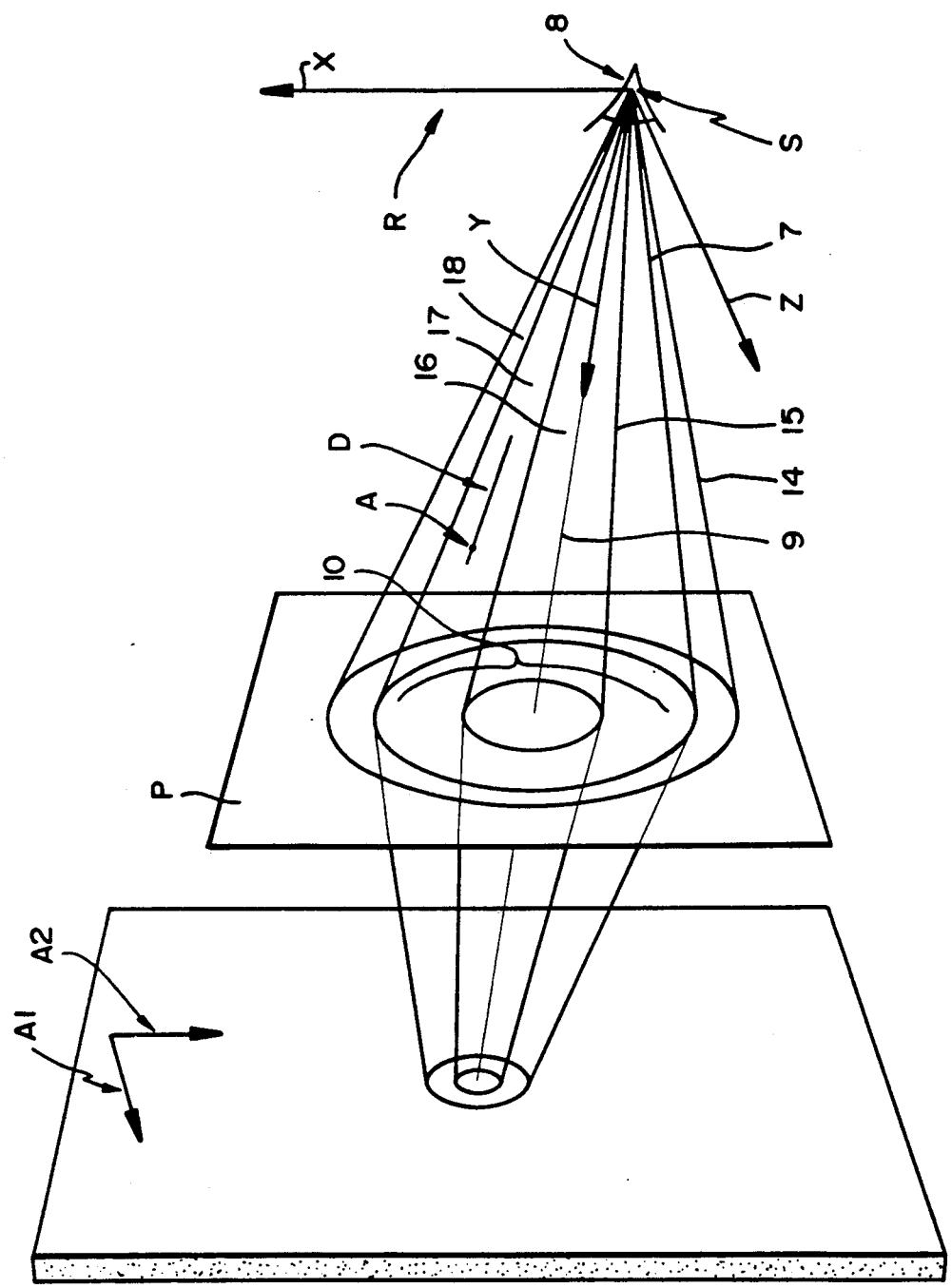
FIG. 1, in perspective, shows a fragmentary diagram of the principle of an apparatus employing the method according to the invention.

Turning to the drawings, an apparatus 1 for observation by at least one person 2 or observer of a subject 3 through at least one optical system 4 that includes the apparatus is seen.

As the drawings show, the optical system 4, for instance an objective, or lens system, enables observation of the subject through an eyepiece 5, for example with a certain magnification, the amount of magnification being adjustable.

To this end, the optical system preferably includes at least one means 6 for adjusting the value of the magnification.

In any case, conventionally, each optical system and/or the associated eyepiece defines a visual field 7, outside of which the subject is no longer seen by the optical system and hence is no longer seen by each eye 8 of the observer.

The field of vision or visual field is defined by a generally conical surface 7 centered on the optical axis of the optical system.

The intersection of the visual field 7 and a plane P of the subject image, which is substantially orthogonal to the optical axis 9 of this optical system, thus determines a zone 10, or observation plane, which for example is circular; and once focusing upon it has been accomplished, this plane embodies the image viewed by the observer.

The optical system also includes at least one means 11 for adjusting the definition of the image, that is, a means enabling focusing in a given plane P of the visual field 7.

It can also be seen that the apparatus 1 itself preferably includes a means 12 for adjusting the position of the visual field with respect to the subject, that is, some means 12 for relative displacement of the subject and the optical system along an axis A1 and/or A2, perpendicular to the optical axis of the optical system, and preferably along two axes perpendicular to one another.

Although this has not been shown in detail, each of the means for adjusting the definition, the magnification of the image and the relative position of the visual field and subject include at least one remote-controllable motive unit, such as an electric motor.

The apparatus also includes at least one device 13 for determining the direction D of the sight of the observer.

The term "sight direction" is understood to mean the preferential direction in which each eye of the observer looks at a point A in space defined by the observation field.

By definition, and in the particular case of an optical system, the visual field 7 is of course included in a larger spatial volume that can be perceived by the observer, known as the field of sight 14.

This field of sight 14 is considered to be centered on the optical axis 9 of the optical system 4 in question.

To command at least one of the means for adjusting the apparatus via a command module 6a, 11a, 12a integrated with an associated means, which are depicted in the preferred embodiment as the means 12 for adjusting the relative position of the visual field 7 and the subject 3, the means 11 for adjusting definition, and the means 6 for adjusting the magnification of the image, in a preparatory phase, at least one principle of command of each adjusting means is defined as a function of the sight direction of at least one observer, and in an executional phase, each adjusting means is made to react by the established principle and as a function of the determined sight direction.

This accordingly makes it possible to obtain, by ocular control, functions that in the prior art could be correctly executed only by manual action.

To avoid untimely commands, the invention provides that, preferably before each adjusting means is commanded, and a certain predetermined period of time after a first determination of the sight direction is made, at least one other determination of the sight direction is made; then at least the analogy between the two directions is verified, so that the command of each means in question is validated by the established principle only where an analogy is found.

To do so, at least at regular time intervals, the sight direction D of at least one eye 8 of the observer 2 is determined in the reference system R associated with the optical system 4 into which this eye 8 looks, so that sporadic displacements of the sight direction will be ignored.

Preferably, in the preparatory phase, at least one imaginary reference system R is defined, such as a reference system having three orthogonal axes X, Y, Z; one axis is considered to coincide substantially with the optical axis 9 of at least one optical system 4, and the other two axes are each substantially parallel to one of the axes A1, A2 of potential displacement of the visual field 7; the origin S of the reference system is considered to coincide approximately with the presumed pupil of an eye 8 of the observer, in such a manner as to enable determining the sight direction D of this eye 8 in the thus-defined reference system R.

According to the invention, to command the displacement of the visual field 7 to a zone of the subject that the observer wishes to have appear as a zone of vision, relative to the reference system R associated with each optical system 4 at the time of its definition, the principle is altered in a variable manner as a function of the magnitude of the angle measured between the sight direction and the optical axis, which makes it possible to isolate in imaginary fashion, in the field of sight 14, at least one central field 15 having its axis approximately coincident with the optical axis 9 of the optical system 4 in question, in the form of a cone with its apex substantially coincident with the center of the pupil of at least one eye of the observer and having its envelope at least partly contained in the visual field 7 and then to divide the field of sight 14 in imaginary fashion into approximately at least two coaxial volumes, which are a central volume 16, in which when the sight direction is detected in it, the function of displacement of the visual field is at least partially inhibited, and a peripheral volume (17, 18), in which when the sight direction is detected in it, the means 12 for adjusting the position of the visual field 7 with respect to the subject is commanded to adjust the position of the visual field in such a manner as to locate the observed point in the central volume 16, and preferably on the optical axis 9 of the optical system 4 in question. Stated another way, when the sight direction is detected in the peripheral volume, the means for adjusting the position of the visual field with respect to the subject is commanded to adjust the visual field such that the observed point is brought within the central volume 16, and preferably directly on the optical axis 9 within the central volume.

For this displacement, the projection, on the axes A1, A2 perpendicular to the optical axis, of the segment that connects the limit points of the relative displacement of the visual field to be performed is determined.

To do so, within the limits of displacement imposed by the means for displacing the visual field, the observer can not only place a desired point of the subject at the center of the zone of vision so as to more comfortably make an observation there, but can also visualize any desired zone of the subject that is not located in the visual field.

Preferably, according to the invention, the principle of command of the means for displacing the field is established in such a manner as to limit the spatial extent of the aforementioned central volume 16 to a volume located in the center of the visual field 7, on the one hand, and on the other, to define and distinguish two generally coaxial volumes 17, 18 in an imaginary fashion in the remaining peripheral volume, these being:

a so-called intermediate volume 17 having an outer envelope substantially corresponding to that of the visual field, minus the central volume 16 in its interior, in which intermediate volume the entry of the sight axis, or determination of the sight direction, determines or dictates a slow displacement of the visual field, and a so-called outer volume 18, having an outer envelope substantially corresponding to that of the field of sight, minus the intermediate volume 17 and central volume 16 in its interior, in which outer volume the entry of the sight axis, or determination of the sight direction, determines or dictates a fast displacement of the visual field.

With a microscope, the limits of the visual field of the optical system lessen the role of the peripheral vision system of the observer, but the knowledge that the surgeon has of what he is observing enables him to designate a zone of the subject he wishes to look at outside this visual field.

The aforementioned principles of the method for controlling the microscope movements that induce displacement of the visual field proceed on the following model: When the surgeon's sight is detected outside the visual field of the microscope, this is interpreted as designating a zone of the subject in peripheral vision.

In this case, at least one of the appropriate devices of the microscope is displaced at maximum speed, to move this zone into the visual field.

As has been explained above, to eliminate possible errors, a validation time is introduced prior to the execution of the command.

When the designated zone arrives in the visual field of the microscope, the central vision system of the observer is capable of assuring the perception, analysis and tracking of the point observed, on the condition that the speed of displacement is not overly high.

To put the object at the center of the field of the microscope where vision is most comfortable, the displacement must accordingly be done at a sufficiently slow speed to enable visual tracking and perception of details.

In the observation plane, the field of the surgeon's sight is accordingly divided into three imaginary zones corresponding to set-point commands of movements of the appropriate devices of the microscope, among which the following can be distinguished:

the central zone, which does not induce any displacement;

the intermediate peripheral zone, which induces a displacement at low speed toward the center of the visual field, and the outer peripheral zone, which induces a displacement at maximum speed as far as the intermediate peripheral zone.

The various parameters defining the extent of each zone, the validation time in the extreme peripheral zone, and the speed of displacement in the intermediate peripheral zone can be adapted to each user.

These parameters must also take into account the magnification of the image, which in turn is defined by adjusting the zoom of the microscope, that is, the elements of the optical system that enable varying the magnification of the image projected onto the retina of the eye of the observer.

The invention also seeks to enable ocular command of the adjustment of definition of the image observed by the operator.

Indeed, both the command of the displacement of the visual field and the ocular command of focusing are equally important, particularly in surgical operations.

For example, in an intraocular operation, the surgeon can work in succession on structures located at different depths.

According to the invention, to command the means for adjusting the focus in a given plane of observation P orthogonal to the optical axis 9 of each optical system 4 and hence other than the plane that appears sharply defined to the observer:

the sight direction D of both eyes 8 of the observer is determined, at least at regular time intervals, and after each determination, the angle of vergency or convergence of the sight of the observer is determined in some way; that is, the angle V between the two sight directions D of the eyes 8 in the plane that includes these directions; next, after each establishment of the angle of vergency, the one that has just been determined is compared with at least the preceding one, determined in such a manner as to detect any variation; then, at least the nature of the variation is detected, that is, the increase or decrease in the angle of vergency V; on the one hand, if this angle has increased, then the means for adjusting the definition is commanded in such a manner as to obtain the focusing in a plane of observation P' closer to the eyes of the observer than the plane P that appears sharply defined, while if the angle of vergency has decreased, then the means for adjusting the definition is commanded in such a manner as to obtain the focusing in a plane of observation P'' farther away from the eyes of the observer than the plane P that appears sharply defined; on the other hand, when no variation whatever is found, the focusing is not shifted and the means for adjusting the definition remains idle.

Preferably, according to the invention, in addition to the nature of the variation of the angle of vergency, the amplitude of this variation is detected and measured, and from it the value of the displacement of the elements that, especially inside the optical system, induce the adjustment of the definition under the influence of the means 11 for adjusting the definition is deduced, in particular by calculation.

This provision for focusing is improved by the fact that the axial magnification of the optics of the microscope is generally equal to the square of the transverse magnification, which brings about an amplification of the movements in the sight directions of each eye and makes the detection of changes in the angle of vergency or convergence more likely.

Accordingly, the observation apparatus to be equipped must have two eyepieces 5, if the benefit of ocular command of focusing is to be attained.

According to the invention, to command the displacement of the visual field, the mean direction D of the orientations of each eye of the observer is determined.

To command the means for adjusting the magnification, in a preparatory step, at least one specific procedure for displacement of the sight of the observer is defined, that is, a procedure to which the observer must adhere to obtain the variation in magnification; and in an executional step, the execution of this procedure is monitored by the sight of the observer, and when it is detected, the magnification function sought is commanded.

Preferably, but not so as to limit the invention, the device 13 for determining the sight direction is of the type in which, to determine the sight direction, at least one of the observer's eyes is illuminated by an infrared light source 19, and then by means of a camera 22, the image of that eye, including that of the pupil and that of the reflection of the source 19 on the corneal diopter, is collected, so that by analysis, the position of the center of the pupil and the position of the aforementioned reflection can be determined, and from them the sight direction can thus be determined.

In addition, but again in a manner not limiting the invention, in order to determine the sight direction of each eye of the observer in the optical system into which he is looking, one eyepiece 5 is associated with each eye 8, and then, on the one hand, at the level of the eyepiece 5 of each optical system 4 in question, at least one first semitransparent plate 20 for the light originating at the image is placed on the path of the light of the image observed by the eye 8, and this plate is oriented in order to send the image of the eye, substantially radially to the optical axis of the optical system 4, onto a second plate 21 that is disposed for this purpose, in order to illuminate at least one camera 22 with the light originating from the eye, and on the other hand, at the level of this second plate but outside the path of the light originating from the eye, a source 19 of light that is preferably invisible to the eye is placed, and this source is oriented so that through the second plate 21, it illuminates the eye by reflection onto the first plate 20 located at the level of the eyepiece 5.

It will thus be understood that the reflection of the source 19 onto the corneal diopter can be collected by the camera 22 via a reflection onto the first plate 20 and then onto the second plate 21.

The camera 22 is for example a charge coupled device camera.

The source 19 for example comprises a light emitting diode, or LED.

The body 23 that houses the semitransparent plates 20, 21 and the source 19 and camera 22 is naturally disposed at the level of each eyepiece in such a manner as not to impede accessibility for the eye or disturb the visual field.

Preferably, the portion 24 of the body 23 that houses the two semitransparent plates 20, 21 and the source 19 is for example oriented radially to the optical axis in the temporal direction of the eye in question.

The portion 25 of the body 23 that houses the camera, in turn, is disposed parallel to the optical system at the level of the eyepiece.

The means that are associated with the invention principally include at least one means 26 for determining the sight direction in a three-dimensional imaginary reference system:

of which, first, one axis X, Y, Z is considered to be substantially coincident with the optical axis 9 of the at least one optical system 4, and the other two axes are considered each to be substantially parallel to one of the axes A1, A2 of potential displacement of the visual field 7, and the origin S of which, second, is considered to be approximately coincident with the presumed center of the pupil of the eye 8 of the observer.

The means intended for performing the invention include in particular at least one means 27 for memorizing at least one command principle for each adjusting means, relative to the preset reference system, as a function of the sight direction.

These means also include at least one means 28 for determining the persistence of sight in a given direction.

These means intended for performing the invention further include:

at least one means 30 for determining the angle of vergency or convergence of the sight direction from the eyes of the observer, at least one means 31 for determining the variation or change in the vergency or angle of convergence of the sight of the observer, at least one means 32 for calculating or determining the position of the plane of definition, taking into account the determined variation or change in vergency, and for commanding (at II) the adjustment of the definition as a function of the calculated position of the plane of definition.

Advantageously, the means intended for performing the invention further include, for commanding the variation in magnification, first at least one means 33 for memorizing a specific procedure for displacement of the sight of the observer, to which the observer must adhere to obtain the variation of the magnification and second, at least one means (not shown) for monitoring and detecting the execution of this procedure with a view to commanding the means for adjusting the magnification.

The means also include at least one means 23, disposed at the level of the eyepiece 5 of at least one optical system 4 and including at least one first semitransparent plate 20, which in turn is disposed in the path of the light of the image of the subject observed by the eye and is oriented so as to send, substantially radially to the optical axis of the optical system, the image of the eye to at least one second semi-reflective plate 21, which in turn is disposed to illuminate at least one camera 22 connected to the device 13 for determining the sight direction; behind this second plate 21, that is, outside the path of the light to the camera, there is at least one source 19 of infrared light aimed at the first plate 20 to illuminate the eye by reflection.

It should be noted that in the drawings, not all the axes are contained in the plane of the drawing and so these have been shown in dashed lines, but they can be considered orthogonal to the plane of the drawing.

Figure 3:
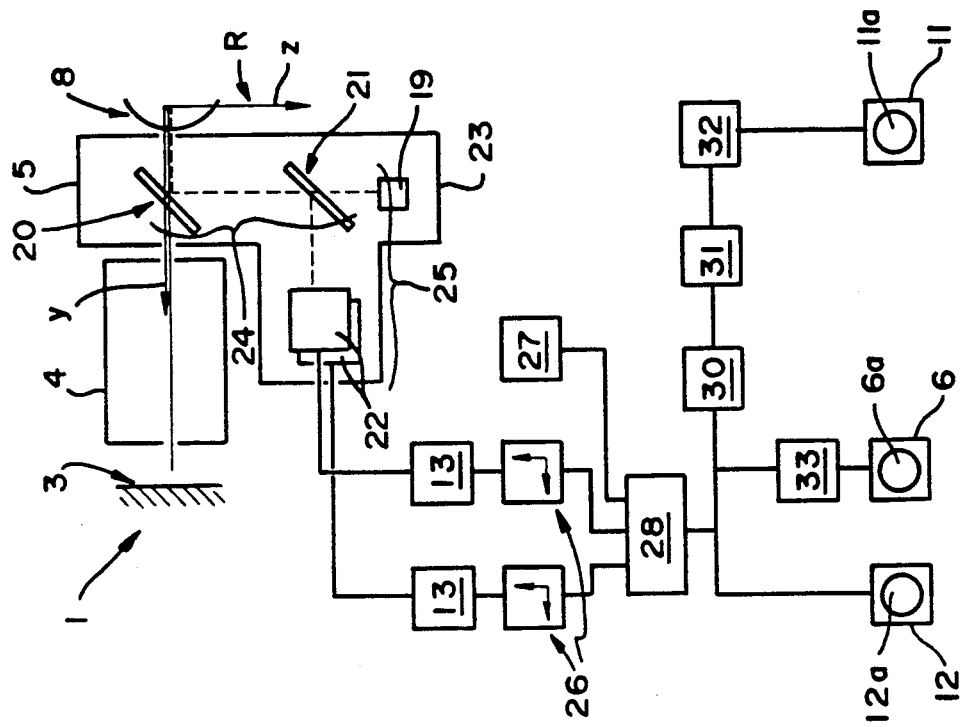
FIG. 3 shows means with which the method of the invention can be performed.
Figure 2:
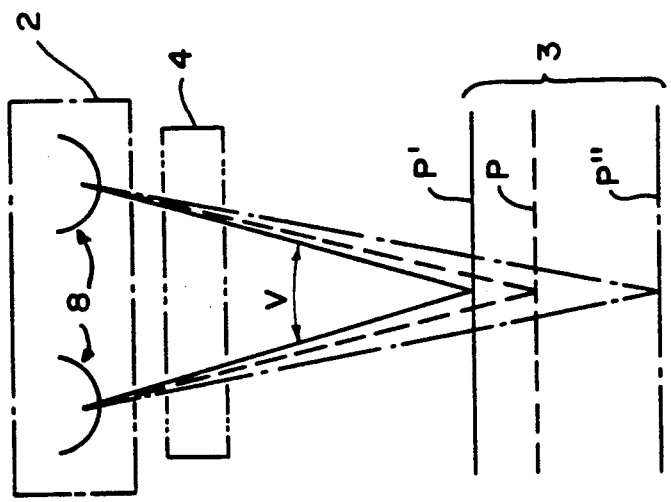
FIG. 2 is a graphic, schematic illustration of a phenomenon exploited by the invention.

It should also be noted that in FIG. 3, the symbol representing the camera 22 has been shown double, to suggest the two cameras associated with the eyepieces.

What is claimed is:

1. A method for automatically controlling an optical system for observation of a subject comprising:
   defining an orthogonal reference system having one axis thereof substantially coincident with an optical axis of said optical system, and having two other axes substantially parallel to two corresponding axes of potential displacement of a visual field of said optical system, and wherein an origin of said reference system is located at a position approximately coincident with a location of a pupil of an eye of an observer using said optical system;
   dividing a field of sight of said optical system into a central volume and a peripheral volume coaxial with and surrounding said central volume, said central volume comprising a central field in the form of a cone having its axis approximately coincident with said optical axis and having its apex substantially coincident with a center of said location of said pupil of said observer, said central field being at least partly contained in said visual field of said optical system;
   defining at least one principle of command of at least one means for adjusting said optical system having a remote command module adapted to operate on said at least one principle of command responsive to a detected sight direction of said observer, said at least one principle of command being defined to control said remote command module and said adjusting means to selectively effect a displacement of said visual field of said optical system relative to said subject in said reference system, said at least one principle of command being defined to at least partially inhibit displacement of said visual field when said sight direction is detected in said central field, and when said sight direction is detected in said peripheral volume, said at least one principle of command effects command of said adjusting means to displace said visual field in such a manner as to bring an observed point along said sight direction within said central volume, substantially on said optical axis of said optical system;
   detecting said sight direction of said observer;
   determining whether said detected sight direction is detected in said central field or in said peripheral field in said field of sight; and
   selectively displacing said visual field of said optical system in response to said detected sight direction and in accordance with said at least one principle of command.

2. Apparatus for automatic control of means for adjusting a viewing device for observation of a subject, said viewing device including an optical system (4) in which at least one visual field (7) centered on an optical axis (9) of said optical system is defined,
   said optical system further defining a field of sight (14) which is approximately coaxial with said visual field (7), said visual field being included in said field of sight, said field of sight defining the largest spatial volume capable of being viewed by the optical system,
   the apparatus further including:
   a command module comprising:
   first means for adjusting the definition of an image and/or for displaying a sharply defined image,
   second means for adjusting, in a direction substantially perpendicular to the optical axis, a relative position of the visual field (7) and the subject (3) being observed, and
   third means for adjusting the magnification of an image of the subject observed;
   means for detecting a sight direction within the field of sight, said sight direction being a direction of observation of an observer, along which direction is located an observation point;
   means for commanding the operating of said first, second, and third adjusting means, said commanding means being operatively coupled to said command module and to said means for detecting said sight direction,
   said commanding means comprising:
   means for defining a reference system (R) having three orthogonal axes, wherein a first of said axes is substantially coincident with said optical axis of said optical system, and the other two axes are substantially perpendicular to said first axis and are substantially parallel to two axes of potential displacement of the visual field, and wherein an origin of said reference system is established to be approximately coincident with a position of the pupil of an eye of the observer, said reference system being used to define said detected sight direction;
   said commanding means further comprising means for defining, for each of said first, second and third adjusting means, a principle of command, each of said principles of command being a function of the detected sight direction, and
   wherein said commanding means operates said first, second and third adjusting means in accordance with a detected sight direction of said observer and in accordance with each of said defined principles of command.

3. Apparatus as recited in claim 2, further comprising:
   means for detecting a sight direction of both eyes of the observer at least at regular time intervals,
   means for determining an angle of vergency of the sight directions of the two eyes of the observer,
   means for detecting variation in the angle of vergency, including means for comparing successively determined angles of vergency, said angle determining means and said angle variation detecting means being operatively coupled to said commanding means.
   wherein said first means for adjusting the definition of an image and/or for displaying a sharply defined image has a defined principle of command such that said first adjusting means operates to focus said optical system at, and/or display a sharply defined image taken at, a plane of observation, said plane of observation being established by said commanding means at a point of vergency of said sight directions of said both eyes of said observer and perpendicular to said optical axis of said optical system, wherein said point of vergency and changes in said point of vergency are determined by said commanding means from said determined angle of vergency of said sight directions and variations detected in said angle of vergency.

4. Apparatus as recited in claim 2, wherein said optical system further comprises:
- means for dividing said field of sight into a central, substantially conical, field and a peripheral field, said central field having an axis approximately coincident with said optical axis and having an apex substantially coincident with a location of an eye of said observer, and said peripheral field surrounding said central field,
- wherein said second adjusting means further comprises means for displacing said visual field and said optical axis of said optical system, and
- wherein said principle of command of said second adjusting means is defined such that when said detected sight direction is in said peripheral field, said displacing means is commanded to move said visual field such that said observation point along said detected sight direction is located within said visual field, and wherein said principle of command of said second adjusting means is defined such that when said detected sight direction is within said central field, operation of said displacing means is at least partially inhibited.

5. Apparatus as defined in claim 2, further comprising:
- means for storing a predetermined sequence of displacements of a sight direction of at least one eye of said observer;
- means for detecting successive sight directions of said at least one eye of said observer;
- wherein said third means for adjusting the magnification of the subject observed has a defined principle of command wherein said third adjusting means operates to adjust said magnification by a predetermined amount in response to said detected successive sight directions following said predetermined sequence of displacements; and
- means operatively coupled to said storing means, said sight direction detecting means and to said third adjusting means, for determining when a plurality of detected successive sight directions are the same as said stored predetermined sequences.

6. A method for automatically controlling an optical system for observation of a subject, comprising:
- defining an orthogonal reference system having one axis thereof substantially coincident with an optical axis of said optical system,
- defining at least one principle of command of at least one means for adjusting said optical system having a remote command module adapted to operate on said at least one principle of command responsive to a detected sight direction of said observer, said at least one principle of command being defined to control said remote command module and said adjusting means to selectively focus said optical system, and/or to display a sharply defined image of a subject under observation, at a plane of observation defined at a point of convergence of a detected sight direction of each eye of said observer, said plane of observation being substantially perpendicular to said optical axis of said optical system,
- detecting a sight direction of both eyes of said observer;
- determining an angle of vergency of said sight directions of the two eyes of the observer;
- defining a plane of observation at a point of convergence of said detected sight directions;
- selectively focussing said optical system and/or displaying a sharply defined image of said subject under observation at said plane of observation;
- detecting variations in said angle of vergency of said detected sight directions;
- defining a new plane of observation when any variation in said angle of vergency is detected.

7. A method for automatically adjusting a magnification of an optical system for observation of a subject comprising:
- defining, in a memory of a command means of said optical system, a predetermined sequence of displacements of a sight direction of said observer, said optical system having means for varying a magnification by a predetermined amount in response to a detection of said predetermined sequence of sight direction displacements;
- detecting displacements of said sight direction;
- comparing said detected displacements of said sight direction to said predetermined sequence of displacements; and
- selectively adjusting said magnification of said optical system in accordance with the detection of said predetermined sequence.

* * * * *